US012131529B2

(12) United States Patent
Ma et al.

(10) Patent No.: US 12,131,529 B2
(45) Date of Patent: *Oct. 29, 2024

(54) VIRTUAL TEACH AND REPEAT MOBILE MANIPULATION SYSTEM

(71) Applicant: TOYOTA RESEARCH INSTITUTE, INC., Los Altos, CA (US)

(72) Inventors: Jeremy Ma, San Jose, CA (US); Josh Petersen, Mountain View, CA (US); Umashankar Nagarajan, Sunnyvale, CA (US); Michael Laskey, Los Altos, CA (US); Daniel Helmick, Cupertino, CA (US); James Borders, Los Gatos, CA (US); Krishna Shankar, Los Altos, CA (US); Kevin Stone, Menlo Park, CA (US); Max Bajracharya, Millbrae, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 18/098,625

(22) Filed: Jan. 18, 2023

(65) Prior Publication Data

US 2023/0154015 A1 May 18, 2023

Related U.S. Application Data

(63) Continuation of application No. 16/570,852, filed on Sep. 13, 2019, now Pat. No. 11,580,724.
(Continued)

(51) Int. Cl.
*B25J 9/16* (2006.01)
*G06F 18/214* (2023.01)
(Continued)

(52) U.S. Cl.
CPC ............ *G06V 20/10* (2022.01); *B25J 9/1605* (2013.01); *B25J 9/1661* (2013.01); *B25J 9/1664* (2013.01);
(Continued)

(58) Field of Classification Search
CPC .... G06V 20/10; G06V 10/751; G06V 10/764; G06V 10/774; G06V 10/82; G06V 20/20;
(Continued)

(56) References Cited

U.S. PATENT DOCUMENTS

| 11,580,724 | B2 | 2/2023 | Ma et al. | |
| 2009/0234501 | A1* | 9/2009 | Ishizaki | B25J 9/1697 700/259 |
| 2020/0238519 | A1* | 7/2020 | Diankov | B25J 9/1697 |

FOREIGN PATENT DOCUMENTS

| JP | 2004333422 A | * 11/2004 | ........... G06T 7/0046 |
| JP | 2005308993 A | * 11/2005 | |

(Continued)

Primary Examiner — B M M Hannan
(74) Attorney, Agent, or Firm — Seyfarth Shaw LLP

(57) ABSTRACT

A method for performing a task by a robotic device includes mapping a group of task image pixel descriptors associated with a first group of pixels in a task image of a task environment to a group of teaching image pixel descriptors associated with a second group of pixels in a teaching image based on positioning the robotic device within the task environment. The method also includes determining a relative transform between the task image and the teaching image based on mapping the plurality of task image pixel descriptors. The relative transform indicates a change in one or more of points of 3D space between the task image and the teaching image. The method also includes performing the task associated with the set of parameterized behaviors based on updating one or more parameters of a set of
(Continued)

parameterized behaviors associated with the teaching image based on determining the relative transform.

20 Claims, 9 Drawing Sheets

Related U.S. Application Data

(60) Provisional application No. 62/877,792, filed on Jul. 23, 2019, provisional application No. 62/877,793, filed on Jul. 23, 2019, provisional application No. 62/877,791, filed on Jul. 23, 2019.

(51) Int. Cl.
| | |
|---|---|
| *G06F 18/28* | (2023.01) |
| *G06N 3/08* | (2023.01) |
| *G06T 7/246* | (2017.01) |
| *G06T 7/33* | (2017.01) |
| *G06T 7/55* | (2017.01) |
| *G06T 7/73* | (2017.01) |
| *G06T 19/20* | (2011.01) |
| *G06V 10/75* | (2022.01) |
| *G06V 10/764* | (2022.01) |
| *G06V 10/774* | (2022.01) |
| *G06V 10/82* | (2022.01) |
| *G06V 20/10* | (2022.01) |
| *G06V 20/20* | (2022.01) |

(52) U.S. Cl.
CPC ........... *B25J 9/1671* (2013.01); *B25J 9/1697* (2013.01); *G06F 18/214* (2023.01); *G06F 18/28* (2023.01); *G06N 3/08* (2013.01); *G06T 7/248* (2017.01); *G06T 7/33* (2017.01); *G06T 7/55* (2017.01); *G06T 7/74* (2017.01); *G06T 19/20* (2013.01); *G06V 10/751* (2022.01); *G06V 10/764* (2022.01); *G06V 10/774* (2022.01); *G06V 10/82* (2022.01); *G06V 20/20* (2022.01); *B25J 9/163* (2013.01); *G05B 2219/37567* (2013.01); *G05B 2219/40543* (2013.01); *G05B 2219/40564* (2013.01); *G06T 2200/04* (2013.01); *G06T 2207/10016* (2013.01); *G06T 2207/10024* (2013.01); *G06T 2207/10028* (2013.01); *G06T 2207/20081* (2013.01); *G06T 2207/20104* (2013.01)

(58) Field of Classification Search
CPC ...... B25J 9/1605; B25J 9/1661; B25J 9/1664; B25J 9/1671; B25J 9/1697; B25J 9/163; B25J 9/1666; G06F 18/214; G06F 18/28; G06N 3/08; G06N 3/045; G06N 20/10; G06T 7/248; G06T 7/33; G06T 7/55; G06T 7/74; G06T 19/20; G06T 2200/04; G06T 2207/10016; G06T 2207/10024; G06T 2207/10028; G06T 2207/20081; G06T 2207/20104; G06T 2207/20084; G05B 2219/37567; G05B 2219/40543; G05B 2219/40564; G05B 2219/40136
USPC .......................................................... 700/245
See application file for complete search history.

(56) References Cited

FOREIGN PATENT DOCUMENTS

| | | | |
|---|---|---|---|
| JP | 2007026309 A | * 2/2007 | |
| JP | 2019118098 A | * 7/2019 | ......... G06K 9/00228 |

* cited by examiner

VIRTUAL TEACH AND REPEAT MOBILE MANIPULATION SYSTEM

CROSS-REFERENCE TO RELATED APPLICATIONS

The present application is a continuation of U.S. patent application Ser. No. 16/570,852, filed on Sep. 13, 2019, and titled "VIRTUAL TEACH AND REPEAT MOBILE MANIPULATION SYSTEM," and claims the benefit of U.S. Provisional Patent Application No. 62/877,792, filed on Jul. 23, 2019, and titled "KEYFRAME MATCHER," U.S. Provisional Patent Application No. 62/877,791, filed on Jul. 23, 2019, and titled "VISUAL TEACH AND REPEAT FOR MANIPULATION-TEACHING VR," and U.S. Provisional Patent Application No. 62/877,793, filed on Jul. 23, 2019, and titled "VISUALIZATION," the disclosures of which are expressly incorporated by reference in their entireties.

BACKGROUND

Field

Certain aspects of the present disclosure generally relate to robotic devices and, more particularly, to a system and method for teaching a robotic device through virtual reality (VR) actions that are parameterized into repeatable behaviors.

Background

The tasks people perform in their homes, or other environments, vary widely. As robotic assistance technology improves, robots will be programmed to execute a wide variety of tasks people perform in an environment, such as a house. This makes developing cost effective, special purpose solutions difficult. Furthermore, environments, objects, and tasks are highly unstructured and diverse. While some objects and tasks are similar, the robot may also encounter a number of objects and tasks that are unique.

Currently, robots may be programmed and/or taught to carry out a task. In conventional systems, the task is specific to an orientation and starting point. It is desirable to improve robotic assistance systems to carry out the same task when the starting point and/or orientations/locations of objects do not align with the programmed or taught task.

SUMMARY

In one aspect of the present disclosure, a method for controlling a robotic device is disclosed. The method includes positioning the robotic device within a task environment. The method also includes mapping descriptors of a task image of a scene in the task environment to a teaching image of a teaching environment. The method further includes defining a relative transform between the task image and the teaching image based on the mapping. The method still further includes updating parameters of a set of parameterized behaviors based on the relative transform to perform a task corresponding to the teaching image.

In another aspect of the present disclosure, a non-transitory computer-readable medium with non-transitory program code recorded thereon is disclosed. The program code is for controlling a robotic device. The program code is executed by a processor and includes program code to position the robotic device within a task environment. The program code also includes program code to map descriptors of a task image of a scene in the task environment to a teaching image of a teaching environment. The program code further includes program code to define a relative transform between the task image and the teaching image based on the mapping. The program code still further includes program code to update parameters of a set of parameterized behaviors based on the relative transform to perform a task corresponding to the teaching image.

Another aspect of the present disclosure is directed to an apparatus for controlling a robotic device. The apparatus having a memory and one or more processors coupled to the memory. The processor(s) is configured to position the robotic device within a task environment. The processor(s) is also configured to map descriptors of a task image of a scene in the task environment to a teaching image of a teaching environment. The processor(s) is further configured to define a relative transform between the task image and the teaching image based on the mapping. The processor(s) still further configured to update parameters of a set of parameterized behaviors based on the relative transform to perform a task corresponding to the teaching image.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
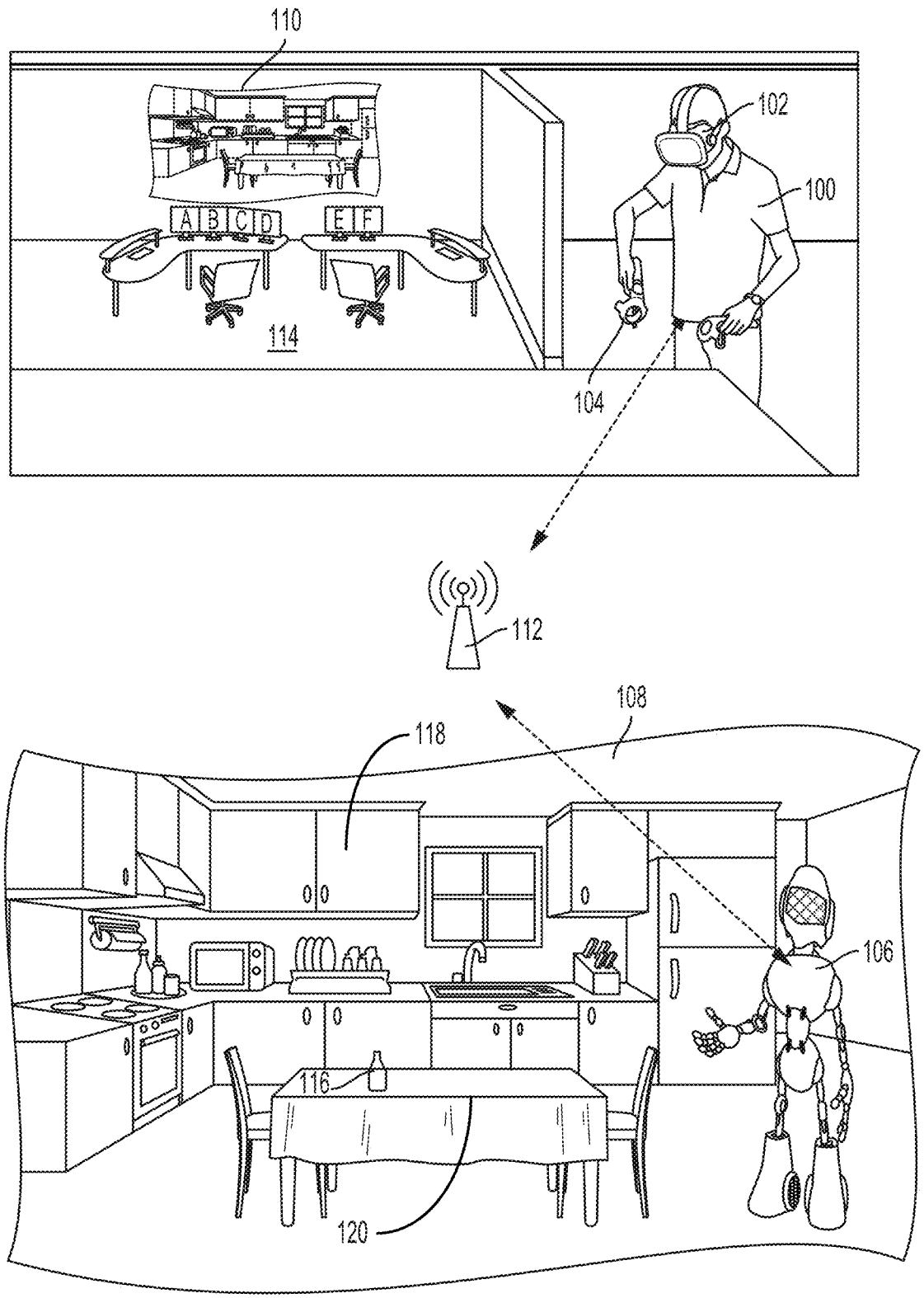
FIG. 1 illustrates an example of an operator controlling a robotic device using a virtual reality platform during training, according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

The world population is aging, with the ratio of those over 65 years of age compared to those under 65 increasing substantially over the next ten years. Robotic assistant systems may assist the population to age in place longer and live a higher quality life. Of course, robotic assistant systems are not limited to assisting the elderly. Robotic assistant systems may be of assistance to in various environments and/or for people of all ages.

Currently, robots may be programmed and/or taught to carry out a task. The task is specific to an orientation and starting point. Generally, robots are not able to carry out the same task when the starting point and/or orientations/locations of objects do not align with the programmed or taught task. In the present disclosure, a robot of a robotic assistance system may also be referred to as a robotic device.

The robot is physically capable of mobile manipulation. The manipulability of the robot is the capacity to change a position of end effectors as a function of joint configuration. In one configuration, the robot is also equipped with automatic whole-body control and planning. This enables a person/human operator to seamlessly demonstrate task space end-effector motions in virtual reality (VR) with little or no concern about kinematic constraints or the robot's posture. The robot includes one or more field-of-view red-green-blue and depth (RGB-D) sensors on a pan/tilt head, which gives human operator in virtual reality significant context to perform a task. An RGB-D image is a combination of an RGB image and its corresponding depth image. A depth image is an image channel in which each pixel relates to a distance between the image plane and the corresponding object in the RGB image.

Aspects of then present disclosure are directed to a mobile manipulation hardware and software system (e.g., a robotic device) capable of autonomously performing complex human-level tasks in different environments, after being taught the task with a demonstration from a human operator in virtual reality. For example, a human operator can teach the robotic device to operate in an environment by operating the robotic device in the environment through a virtual reality platform.

In one aspect, the robotic device is positioned in the environment and image data of the scene is collected. The robotic device is then controlled (e.g., through a virtual reality interface) to carry out a task. Restricting the human operator's view, in virtual reality, to the robotic device's view, during training, ensures that the robotic device has sufficient information to perform the task on its own.

The method of teaching an action/task to the robotic device may include parameterizing behaviors performed by the operator through the virtual reality interface. For example, the virtual reality interface may include the use of paddles, handheld controllers, paintbrush tools, wiping tools and/or placement tools manipulated by the operator while wearing a headset depicting a VR environment. Thus, rather than teaching direct task space motions, the human operator teaches a set of parameterized primitives (or behaviors). The parameterized primitives combine collision free motion planning and hybrid (position and force) Cartesian control, to reduce the taught parameters and provide robustness during execution.

Parameterized behaviors refer to learning a task by chunking that task into a smaller number of discrete behaviors. Each behavior is defined by a set of parameters, such as a joint angle change, a rotation angle, or the like. The values of these parameters may be configured and updated based on the situation of the robot when executing the task. Parameterized behaviors may be learned and extracted from one learned task and combined together with other tasks to form a larger task. A parameterized behavior, such as opening a door having a rotating handle, may be implemented to execute opening any door handle (e.g., one that requires thirty (30) degrees of rotation or one that requires sixty (60)

degrees or more of rotation). For example, the degrees of rotation may be one parameter that defines the parameterized behavior of opening a door having a rotating door handle.

The performed task is defined into sets of parameterized behaviors and related to the image data of the scene in which the action was performed. The parameterized behaviors are linked to the scene using robust learned dense visual keypoint embeddings, with virtual reality-based masking of relevant parts of the scene. In one configuration, pixels of a test image are compared to pixels of a reference image. The reference image may be referred to as a keyframe. The keyframe may be obtained during training. The use of a keyframe provides invariance to pose and image transformations. A vision system determines that the test image matches the keyframe when a number of matching pixels is greater than a threshold. In one configuration, the vision system compares pixel descriptors to identify matching pixels of the test image and keyframe. The pixel descriptors include pixel level information and depth information. The pixel level information includes information such as an RGB value of the pixel as well as the context of the pixel within the image/surrounding pixels.

To perform a task, the robotic device may be positioned (relative to an initial position during training) within the same or similar environment. The robotic device may be positioned at a different starting location and optionally with a different starting pose (e.g., joint angles are adjusted to different starting positions) relative. The robotic device may be tasked (without control of the human operator) with carrying out the same task (e.g., a set of parameterized behaviors) such as picking up a bottle, opening a cabinet, and placing the bottle within the cabinet. For example, the robotic device may carry out the same task by updating the parameters of the behaviors that were taught during the virtual reality controlled sequence. The parameters may be updated based on a current pose and/or location of the robotic device, relative to the pose and/or location used during training.

To update the parameters, the robotic device captures an initial image of the scene and maps pixels and/or dense neural network descriptors from the new image to the image during training, which is referred to as a keyframe. The keyframe is a snap shot of an image with depth information that is seen by the robotic device. The mapping defines a relative transform between the new image and the image during training (e.g., the keyframe).

The relative transform provides a mapping of the keyframe to the new image. The mapping may be performed by matching pixels and/or dense neural network descriptors in the different images. The relative transform may be defined by a change in an x-axis position, y-axis position, z-axis position, roll, pitch, and yaw of the robot. The relative transform may be used to update the parameters of the parameterized behavior from the taught parameters to the observed situation.

The relative transform may be applied to the parameterized behaviors. By applying the relative transform to the parameterized behaviors, the robotic device may carry out the same task as previously taught even if the starting position and/or pose has changed. The robot system may continuously map pixels and/or dense neural network descriptors from the present scene to those from the keyframe, such that adjustments may be continually made to the parameterized behaviors. For example, the relative transform may be applied to a taught action, defined by a set of parameterized behaviors, such as pulling open a drawer, opening a door, picking up a cup or bottle, or the like.

In some aspects, actions may be related to an entire scene and/or may be specific to an object. For example, an action to pick up a bottle may include the use of keyframes related to the entire scene to navigate to a bottle and once the bottle is approached, keyframes specific to the bottle may be analyzed independent of the environment. Navigation behavior is used to move the robot from one point to another. This may allow the robot to locate an object such as a bottle that may be anywhere within an environment and then perform a task such as "picking up" the bottle regardless of where it is located during the training of "picking up" action. A manipulation behavior is used to move parts of the robot (e.g., torso and/or arms) to make contact with the desired object.

FIG. 1 illustrates an example of an operator 100 controlling a robotic device 106 using a virtual reality platform during training, according to aspects of the present disclosure. As shown in FIG. 1, an operator 100 is provided with a vision system 102 and motion controllers 104 (e.g., gesture tracking system) for controlling a robotic device 106. The vision system 102 may provide a video feed as well as capture the operator's 100 gaze. The operator 100 may be in a location that is remote from a location of the robotic device 106. In the present example, the robotic device 106 is located in a kitchen 108 and the operator 100 is in a location that is different from the kitchen 108, such as a robot control center 114.

The vision system 102 may provide a video feed of the location of the robotic device 106. For example, the vision system 102 may provide a view of the kitchen 108 based on the robotic device's 106 forward perspective. Other perspectives, such as a three hundred and sixty degrees (360°) view may be provided. The perspectives are provided via one or more vision sensors, such as a video camera, of the robotic device 106. The vision system 102 is not limited to a head-set as shown in FIG. 1. The vision system 102 may also be a monitor 110, an image projector, or other system capable of displaying a video feed from the robotic device 106.

One or more actions of the robotic device 106 may be controlled via the motion controllers 104. For example, the motion controllers 104 capture the operator's 100 gestures and the robotic device 106 mimics the captured gestures. The operator 100 may control the robotic device's 106 locomotion, limb movement, and other actions via the motion controllers 104. For example, the operator 100 may control the robotic device 106 to grab a bottle 116 on a table 120 and to open a cabinet 118 and place the bottle 116 in the cabinet 118. In this case, the bottle 116 is in an upright position or pose. The behaviors performed by the operator 100 are parameterized through the virtual reality interface. Each of the behaviors is defined by a set of parameters, such as a joint angle change, a rotation angle, or the like. The values of these parameters may be configured and updated based on the situation of the robot when executing the task. Parameterized behaviors may be learned and extracted from one learned task and combined together with other tasks to form a larger task.

Figure 2A:
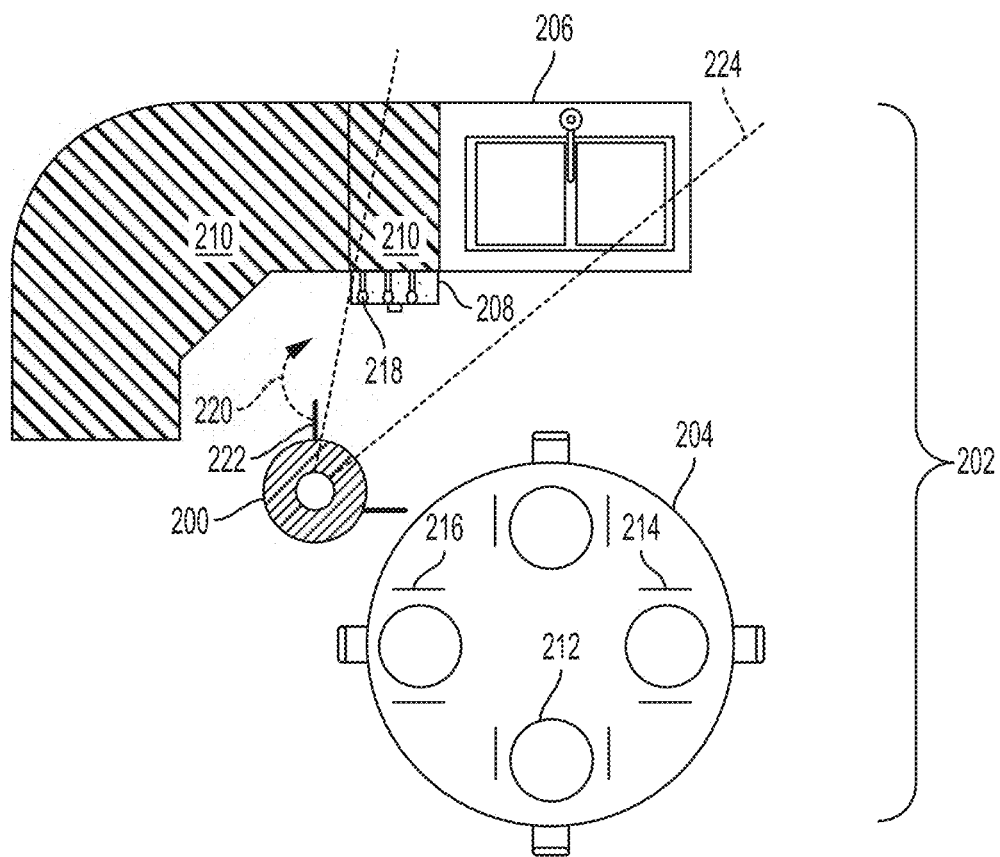
FIG. 2A illustrates an example of a robotic device operating in an environment according to aspects of the present disclosure.
Figure 2B:
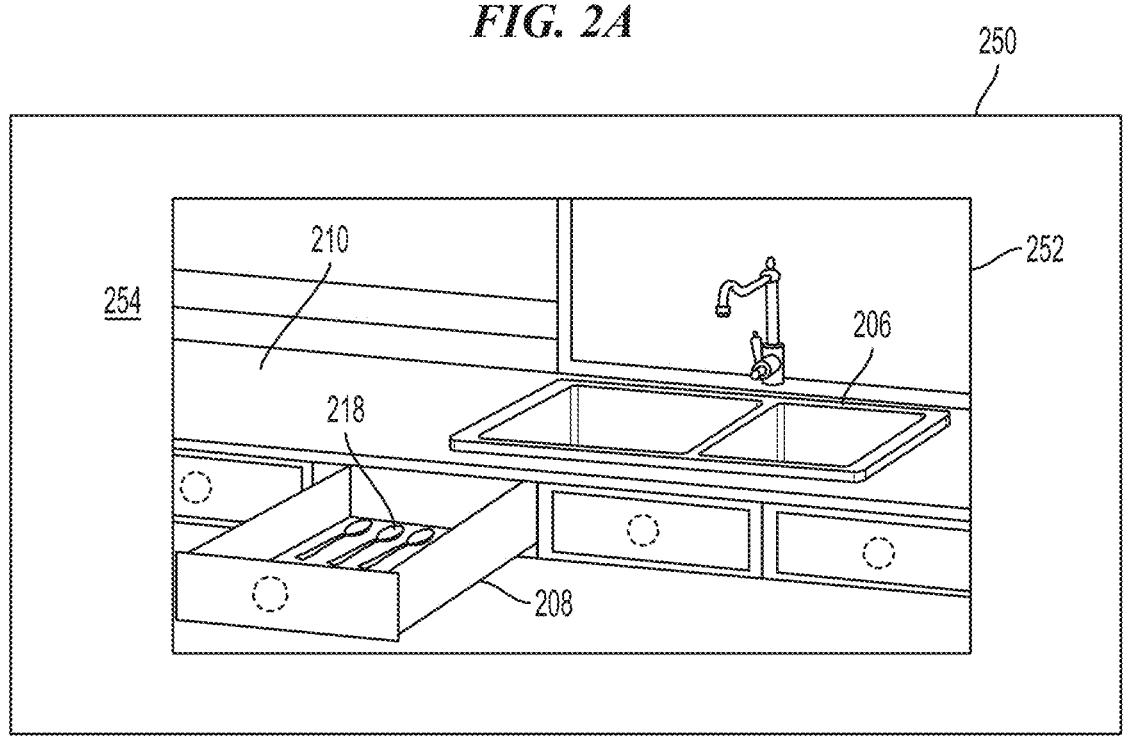
FIG. 2B illustrates an example of a video feed provided to an operator of a robotic device, according to aspects of the present disclosure.

In one aspect, the virtual reality interface for training may include a user wearing a headset and holding controllers that allow for interactive operation control of robot motions. The environment depicted in the virtual reality headset is a virtual reality environment of the real environment as seen from the robotic device 106, such as the view depicted in FIG. 1. Another view may include an operator view as depicted in FIGS. 2A and 2B below. In some aspects, a user interface provides a paintbrush tool to annotate or highlight the object that is to be acted upon such as a bottle on a countertop. For example, through a depicted voxel map of the environment, which may be generated by the virtual reality generator, an operator/user can paint the segments of the voxel map that the object to be interacted with occupies. Other user tools include wiping tools or placement tools where an operator can draw a box in the voxel map where the action should be carried out.

Aspects of the present disclosure are not limited to capturing the operator's 100 gestures via the motion controllers 104. Other types of gesture capturing systems are contemplated. The operator 100 may control the robotic device 106 via a wireless connection 112. Additionally, the robotic device 106 may provide feedback, such as the video feed, to the operator 100 via the wireless connection 112.

FIG. 2A illustrates an example of an operator (not shown) controlling a robotic device 200 in a dining environment 202 according to aspects of the present disclosure. For clarity, FIG. 2A provides a top-down view of the dining environment 202. As shown in FIG. 2A, the dining environment 202 includes a dining table 204, a sink 206, a drawer 208 with spoons 218, and a counter 210. The operator is at a location that is remote from the dining environment 202.

In the example of FIG. 2A, the robotic device 200 has been controlled to set plates 212, knives 214, and forks 216 on the dining table 204. After setting the plates 212, knives 214, and forks 216 on the dining table 204, the operator may gesture towards the spoons 218. The gesture may include one or more of a movement 220 of a limb 222 towards the spoons 218, directing a field of view 224 (e.g., gaze) towards the spoons 218, moving the robotic device 200 towards the spoons, and/or another action.

FIG. 2B illustrates an example of a display 250 provided to an operator according to aspects of the present disclosure. The display 250 may be a vision system, such as a head-set, a monitor, or other type of display. As shown in FIG. 2B, the display 250 includes a video feed 252 provided from a vision sensor of the robotic device 200. For example, based on the robotic device's 200 field of view 224, the video feed 252 displays the sink 206, counter 210, drawer 208, and spoons 218. In one configuration, a point-cloud representation (not shown) may be overlaid with the video feed 252. The operator may guide the robotic device 200 through an environment, such as the dining environment 202, based on the video feed 252.

The display 250 may also include an on-screen indication area 254 for providing notifications to the operator. As shown in FIG. 2B, the on-screen indication area 254 is distinct from the video feed 252. Alternatively, the on-screen indication area 254 may overlap with the video feed 252.

In one configuration, a robotic device 200 associated with a robotic control system identifies a scene of the task image within a vicinity of the robotic device 200. For example, the robotic device 200 identifies potential targets in the robotic device's 200 field of view 224. In this example, the sink 206, counter 210, drawer 208, and spoons 218 are identified as potential targets. For example, the robotic device may be tasked with setting the table, which includes carrying the spoons 218 from the drawer 208 to the dining table 204. Accordingly, the spoons 218 in the drawer 208 are deemed potential targets for the task.

For example, the robotic device 200 may be taught to grasp one or more of the spoons 218 and to perform an action (e.g., place the spoons 218 on the table 204). As such, the robotic device 200 may open a hand attached to the limb 222 to prepare for grasping one or more spoons 218. As another example, the robotic device 200 may adjust a gesture or current motion to improve an action. The robotic device 200 may adjust an angle of approach of a limb 222 to improve the grasping of the spoons 218. The adjustment of a gesture, motion, and/or limb may be parameterized and stored for a particular task associated with a particular scene.

Figure 3A:
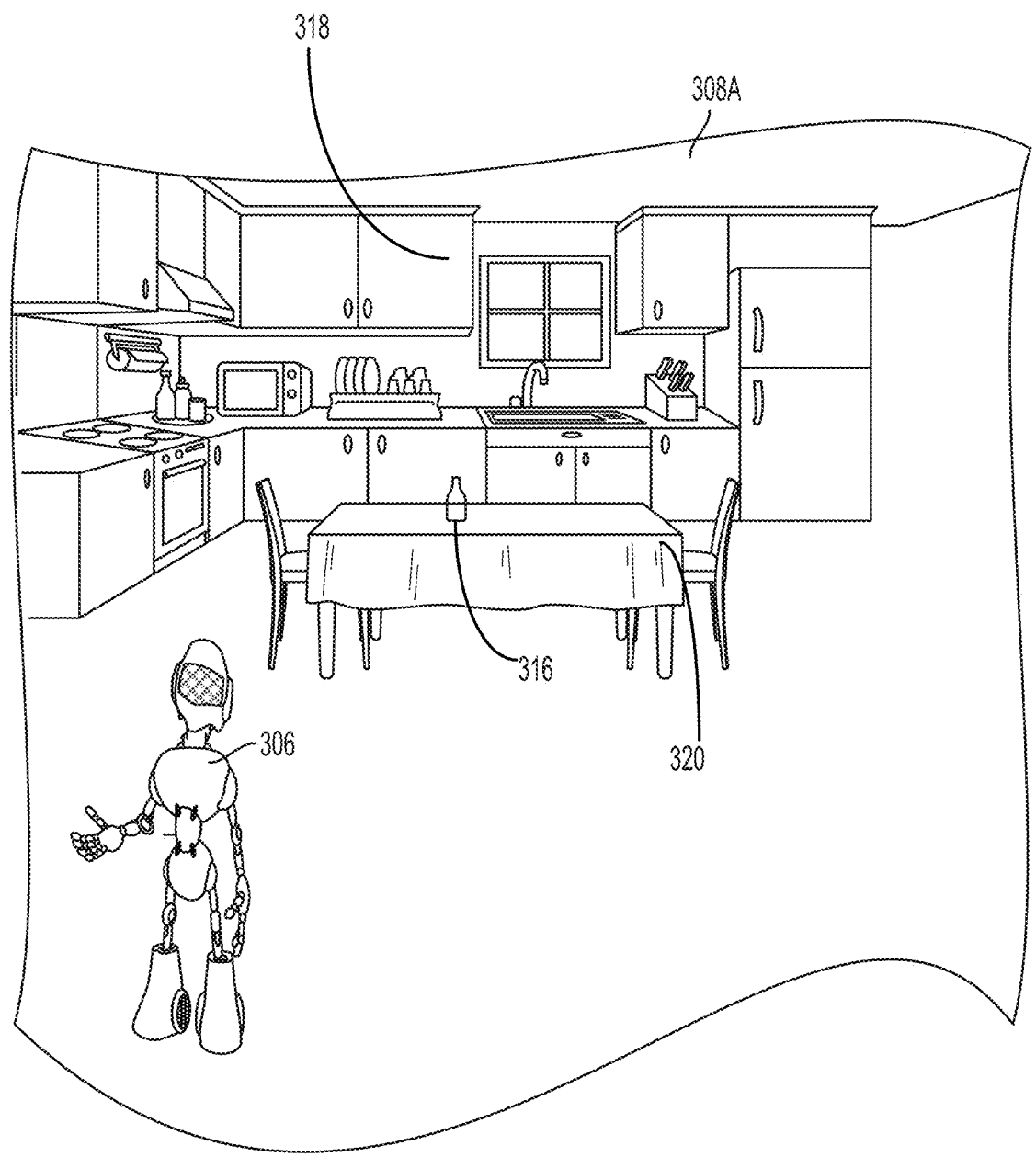
FIG. 3A illustrates an example of a robotic device performing a task from a different starting position but same environment, relative to the environment and starting position illustrated in FIG. 1.

FIG. 3A illustrates an example of a robotic device 306 performing a task from a different starting position but same environment, relative to the environment and starting position illustrated in FIG. 1. The robotic device 306 autonomously performs complex human-level tasks in real homes, after being taught the task with a demonstration (e.g., a single demonstration) from a human operator in virtual reality. For example, a human operator can teach the robotic device 306 to operate in a teaching environment, as illustrated in FIGS. 1-2. The teaching environment corresponds to the training kitchen 108 and the task environment corresponds to the task kitchen 308A.

Although the training kitchen 108 of FIG. 1 is the same as the kitchen 308A of FIG. 3A, the kitchen 308A does not have to be the same as the kitchen 108. For example, the task kitchen 308A may include a different refrigerator, a different table (e.g., the table 320), a different oven, different cabinets, etc., positioned in similar locations as the training kitchen 108. For example, parameters of the behaviors that were taught during the virtual reality controlled sequence are updated when the robotic device 306 is tasked (without control of the human operator) with carrying out a task (e.g., a set of parameterized behaviors) such as picking up a bottle (e.g., the bottle 116 of FIG. 1 or the bottle 316 of FIG. 3A), opening a cabinet (e.g., the cabinet 118 of FIG. 1 or the cabinet 318 of FIG. 3A), and placing the bottle within the cabinet.

The robotic device 306 is specified to update the set of parameterized behaviors because the initial position of the robotic device 306 is different from the initial position of the robotic device 106. Additionally, because of the difference in the initial position of the robotic device 306, the starting image associated with the new task may be different than that for the task for which the robotic device was trained.

To update the parameters, the robotic device 306 captures a new task image (e.g., using vision or high resolution cameras) of the scene from an initial position of the robotic device 306 within a task environment. In one aspect, the initial position of the robotic device 306 deviates from starting conditions or positions that the robotic device 306 was taught to perform a task in a teaching environment (e.g., in FIG. 1) using a virtual reality (VR) interface. For example, the deviations from the starting conditions or positions includes a different starting location and/or pose of the robotic device.

For example, when the robotic device 306 is tasked with picking up the bottle 316, opening a cabinet 118, and placing the bottle 316 within the cabinet 318, the robotic device 306 updates its parameters based on mapping pixels and/or descriptors (e.g., dense neural network descriptors) from the new image to the image during training. The mapping defines a relative transform between the new image and the image during training.

The relative transform maps the training image to the new image by matching pixels and/or dense neural network descriptors in the different images. The relative transform may be defined by a change in an x-axis position, y-axis position, z-axis position, roll, pitch, and yaw of the robotic device 306. The relative transform is used to update the parameters of the parameterized behavior from the taught parameters to the observed situation. For example, the parameterized behaviors corresponding to navigation behaviors and/or manipulation behaviors may be adjusted to compensate for the change in the starting location and/or pose of the robotic device.

Figure 3B:
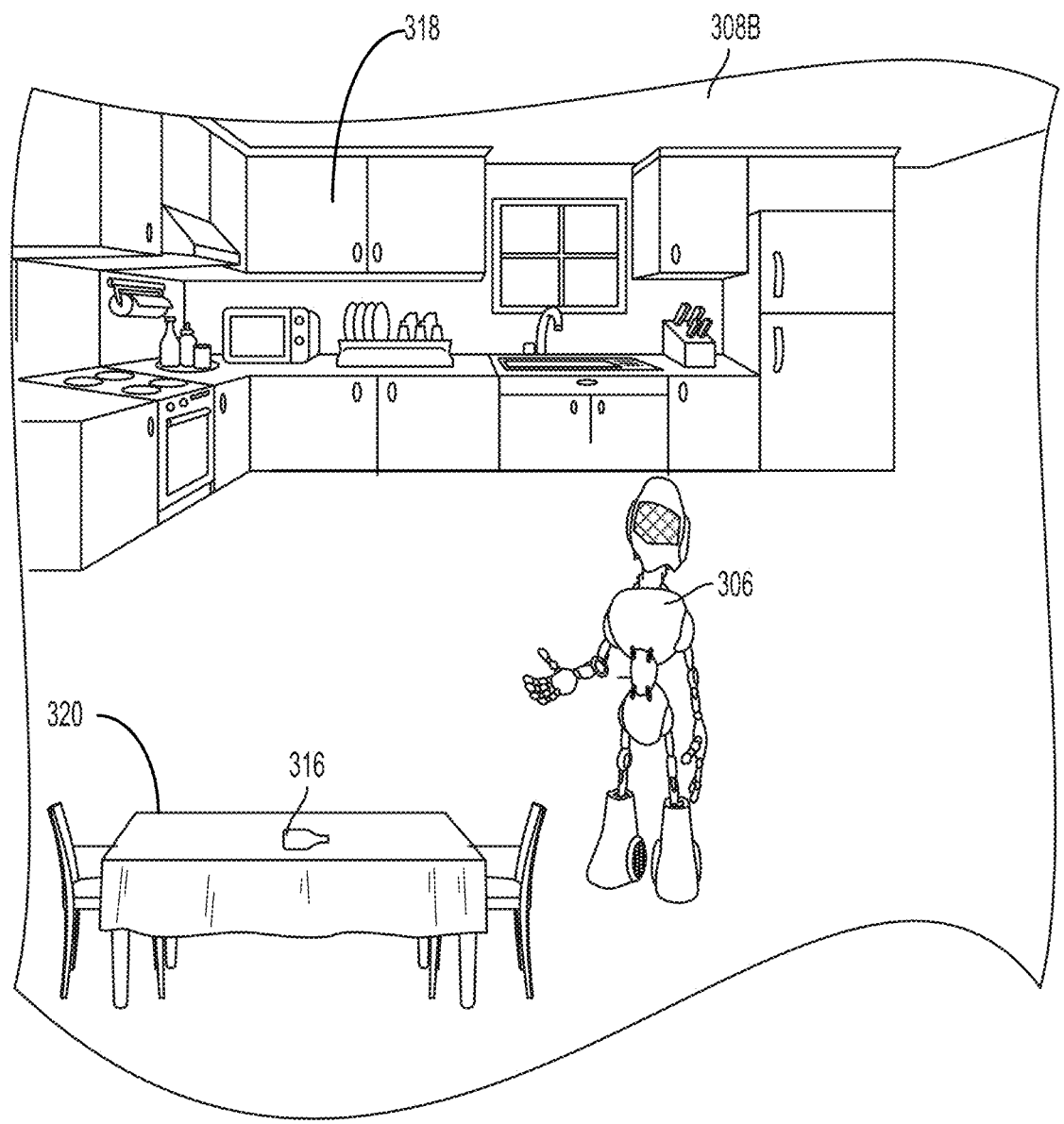
FIG. 3B illustrates an example of a robotic device performing a task from a different starting position and a similar but different environment, relative to the environment and starting position illustrated in FIG. 1.

FIG. 3B illustrates an example of a robotic device 306 performing a task from a different starting position and a similar but different environment, relative to the environment and starting position illustrated in FIG. 1. The kitchen 308B is different from the training kitchen 108 of FIG. 1. For example, the table 120 of FIG. 1 on which the bottle 116 is placed is in a different location than the table 320 on which the bottle 316 is placed in the example of FIG. 3. Further, the placement of the bottle 316 in FIG. 3B is different than the placement of the bottle 116 of FIG. 1. Additionally, the starting position of the robotic device 306 in FIG. 3B is different than the starting position of the robotic device 106 of FIG. 1.

When the robotic device 306 is tasked with picking up the bottle 316, opening the cabinet 318, and placing the bottle 316 within the cabinet 318, the robotic device 306 is specified to update the set of parameterized behaviors because the initial position of the robotic device 306 and the placement of the bottle 316 is different from the initial position of the robotic device 106 and the placement of the bottle 116 during the training (see FIG. 1). For example, the robotic device 306 may adjust parameterized behaviors corresponding to an angle of approach of a limb of the robotic device (e.g., the limb 222 of FIG. 2) to improve the grasping of the bottle 316.

Figure 4:
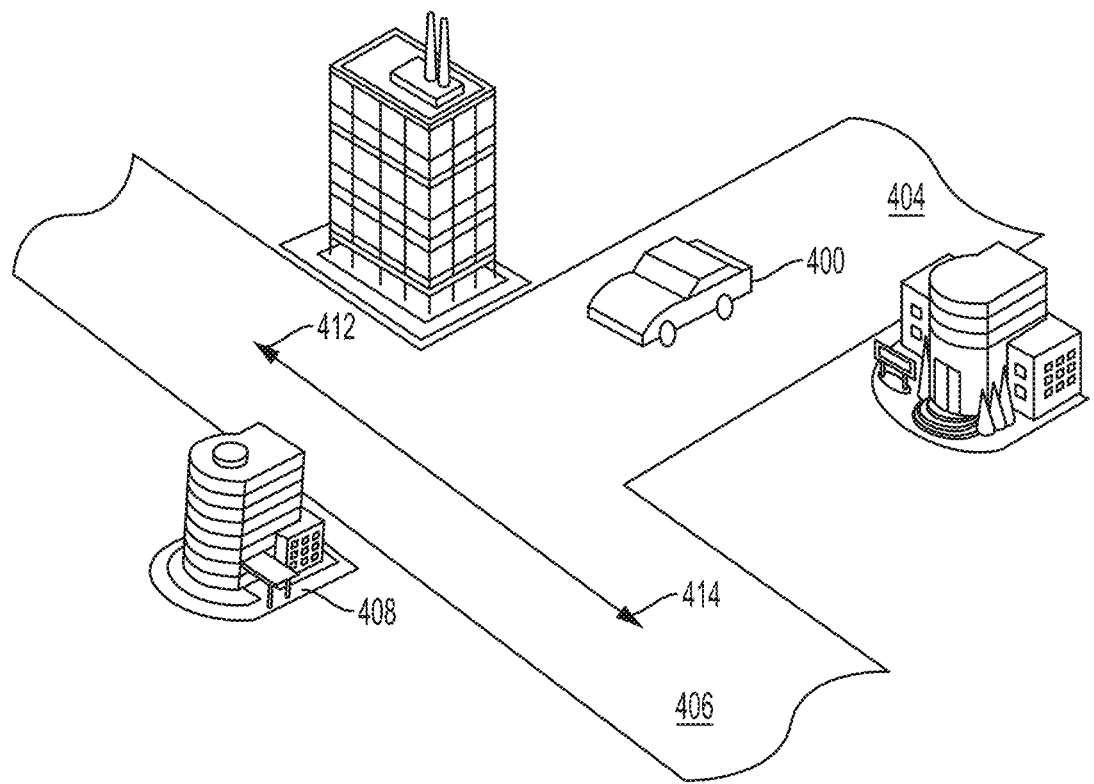
FIG. 4 illustrates an example of a robotic device operating in an environment according to aspects of the present disclosure.

The robotic control system is not limited to performing actions on identified targets. Aspects of the present disclosure may also be used for navigating an autonomous or semi-autonomous vehicle, such as a car. As shown in FIG. 4 an operator may control a vehicle 400 (e.g., autonomous vehicle) in an environment, such as a city 402, via a user interface, such as a remote control. The operator may be in a location that is remote from the city 402 of the vehicle 400. As discussed herein, the video feed may be provided to the operator via one or more sensors on the vehicle 400. The sensors may include a camera, such as a light detection and ranging (LiDAR) sensor, a radio detection and ranging (RADAR) sensor, and/or another type of sensor.

As shown in FIG. 4, the operator controls the vehicle 400 to move along a first street 404 towards an intersection with a second street 406. To avoid a collision with a first building 408, the vehicle 400 needs to turn right 412 or left 414 at the intersection. Similar to the robotic device, the behaviors performed by the operator are parameterized through the virtual reality interface.

As discussed, aspects of the present disclosure are directed to a mobile manipulation hardware and software system capable of autonomously performing human-level tasks in real world environments, after being taught the task with a demonstration from a person in virtual reality. In one configuration, a mobile manipulation robot is used. The robot may include a whole-body task space hybrid position/force control. Additionally, as discussed, parameterized primitives linked to a robust learned dense visual embeddings representation of the scene is taught to the robot. Finally, a task graph of the taught behaviors may be generated.

Rather than programming or training a robot to recognize a fixed set of objects or perform pre-defined tasks, aspects of the present disclosure enable the robot to learn new objects and tasks from a human demonstration. The learned tasks may be executed autonomously by the robot in naturally varying conditions. The robot does not use prior object models or maps, and can be taught to associate a given set of behaviors to arbitrary scenes and objects from one example. The visual system is trained offline on existing supervised and unsupervised datasets, the rest of the system may function without additional training data.

In contrast to conventional systems that teach direct task space motions, aspects of the present disclosure teach a set of parameterized behaviors. These behaviors combine collision free motion planning and hybrid (position and force) Cartesian end-effector control, minimizing the taught parameters and providing robustness during execution.

In one configuration, task specific learned dense visual pixel-wise embeddings are computed. These pixel-wise embeddings link the parameterized behaviors to the scene. Due to the linking, the system may handle diverse environments with high robustness by sacrificing generalization to new situations.

The behaviors of a task may be taught independently, with visual entry conditions, and success-based exit criteria. The behaviors may be chained together in a dynamic task graph. Because the behaviors are chained, the robot may reuse behaviors to perform task sequences.

The robot may include multiple degrees-of-freedom (DOF). For example, the robot may include 31 degrees-of-freedom (DOF) split into five subsystems: the chassis, torso, left arm, right arm, and head. In one configuration, the chassis includes four driven and steerable wheels (e.g., eight total DOF) that enable "pseudo-holonomic" mobility. The drive/steer actuator package may include various motors and gearheads. The torso may include five DOF (yaw-pitch-pitch-pitch-yaw). Each arm may include seven DOF. The head may be a two DOF pan/tilt head. Each arm may also include a single DOF gripper with under-actuated fingers. Aspects of the present disclosure are not limited to the robot discussed above. Other configurations are contemplated. In one example, the robot includes custom tools such as a sponge or a swiffer tool.

In one configuration, a force/torque sensor is integrated with the robot to measure interaction forces with the environment. For example, the force/torque sensor may be placed at a wrist of each arm. The perception sensors may be consolidated on the head to provide a wide field of view while also provide the robot and a person in VR context to perform the task.

Aspects of the present disclosure provide several levels of abstraction for controlling the robot. In one configuration, the lowest control levels provide real-time coordinated control of all of the robot's DOF. Real-time control may include joint control and part control. Joint control implements low-level device communications and exposes the device commands and statuses in a generic way. Additionally, joint control supports actuators, force sensors, and inertial-measurement-units. The joint control may be configured at run-time to support different robot variations.

Part control may handle higher level coordination of the robot by dividing the robot into parts (e.g., right arm, head, etc.) and providing a set of parameterized controllers for each part. The part control may provide controllers for: joint position and velocity; joint admittance; camera look; chassis position and velocity; and hybrid task space pose, velocity, and admittance control.

End-effector task space control provides another level of abstraction for controlling the robot. This level of abstraction solves for the robots posture to achieve these desired motions. Whole-body inverse kinematics (IK) for hybrid Cartesian control are formulated as a quadratic program and solved. Parts may be subject to linear constraints on joint position, velocity, acceleration, and gravity torque.

Whole-body IK may be used for motion planning of Cartesian pose goals. In one configuration, occupied environment are fit with spheres and capsules. Voxel collision constraints are added to the quadratic program IK to prevent collisions between the robot and the world. Motion planning may be performed using a rapidly-exploring random tree (RRT), sampling in Cartesian space with the quadratic program IK as the steering function between nodes.

Planning in Cartesian space results in natural and direct motions. Using the quadratic program IK as the steering function improves a reliability of planning, as the same controller may be used to plan and execute, reducing the possible discrepancies between the two. Similarly, motion planning for joint position goals uses an RRT in combination with the part control joint position controller acting as the steering function.

The next level of abstraction defines parameterized behaviors. In one configuration, parameterized behaviors are primitive actions that can be parameterized and sequenced together to accomplish a task. The behaviors may include, but are not limited to: manipulation actions such as grasp, lift, place, pull, retract, wipe, joint-move, direct-control; navigation actions such as drive with velocity commands, drive-to with position commands, and follow-path with active obstacle avoidance; and other auxiliary actions such as look at and stop.

Each behavior can have single or multiple actions of different types, such as joint or Cartesian moves for one or more of the robot's parts. Each action can use different control strategies such as position, velocity or admittance control, and can also choose to use motion planning to avoid external obstacles. The robot's motions, regardless of whether they use motion planning, avoid self-collision and satisfy motion control constraints.

Each behavior may be parameterized by the different actions, which in turn will have their own parameters. For example, a grasp behavior may consist of four parameters: gripper angle, 6D approach, grasp, and (optional) lift poses for the gripper. In this example, these parameters define the following pre-defined sequence of actions: (1) open the gripper to desired gripper angle; (2) plan and execute a collision-free path for the gripper to the 6D approach pose; (3) move the gripper to the 6D grasp pose and stop on contact' (4) close the gripper; and (5) move the gripper to the 6D lift pose.

The final level of control abstraction is a task. In one configuration, a task is defined as a sequence of behaviors that enable the robot to manipulate and navigate in a human environment. A task graph (see FIG. 5) is a directed, cyclic or acyclic, graph with different tasks as nodes and different transition conditions as edges, including fault detection and fault recovery. Edge conditions include the status of each behavior execution, checking for objects in hand using force/torque sensors, voice commands, and keyframe matches to handle different objects and environments.

According to aspects of the present disclosure, a perception pipeline is designed to provide the robot with an understanding of the environment around it. The perception pipeline also provides the robot with an ability to recognize what actions to take, given the task it has been taught. In one configured, a fused RGB-D image is created by projecting the multiple depth images into one wide field-of-view image (e.g., wide field-of-view left image) of the high resolution color stereo pair. The system runs a set of deep neural networks to provide various pixel level classifications and feature vectors (e.g., embeddings). The pixel level classifications and feature vectors are accumulated into a temporal 3D voxel representation based on the visual features recalled from a taught sequence. The pixel level classifications and feature vectors may be used to recall actions to perform.

In one configuration, object categories are not defined. Additionally, or models of objects or the environment are not assumed. Rather than explicitly detecting and segmenting objects, and explicitly estimating 6-DOF object poses, a dense pixel level embedding may be produced for various tasks. The reference embeddings from a taught sequence may be used to perform per behavior classification or pose estimation.

The trained models may be fully convolutional. In one configuration, pixels in the input image are mapped to a point in an embedding space, respectively. The embedding space is endowed with a metric that is implicitly defined by loss functions and training procedures defined by the model's output. The trained models may be used for various tasks.

In one configuration, the trained model detects all objects of a semantic class given a single annotated example. The objects of the semantic class may be detected by comparing the embeddings on the annotation to embeddings seen in other areas. This model may be trained with a discriminative loss function.

A model may be trained to determine object instances. This model identifies and/or counts individual objects. The model may be trained to predict a vector (2D embedding) at each pixel. The vector may point to the centroid of the object containing that pixel. At run-time, pixels that point to the same centroid may be grouped to segment the scene. The run-time execution may be performed in 3D.

A model may also be trained for 3D correspondence. This model produces per pixel embeddings that are invariant to view and lighting, such that any view of a given 3D point in a scene maps to the same embedding. This model may be trained using a loss function.

The pixelwise embeddings (and depth data) for each RGB-D frame is fused into a dynamic 3D voxel map. Each voxel accumulates first and second order position, color, and embeddings statistics. Expiration of dynamic objects is based on back projection of voxels into the depth image. The voxel map is segmented using standard graph segmentation based on the semantic and instance labels, and geometric proximity. The voxel map is also collapsed down into a 2.5D map with elevation and traversability classification statistics.

The voxel map is used for collision free whole-body motion planning, while the 2.5D map is used for collision free chassis motions. For 3D collision checking, the voxels in the map may be grouped into capsules using a greedy approach. The segmented objects may be used by the behaviors to attach objects to hands when they are grasped.

The robot may be taught with a one-shot teaching approach, such that the robot recognizes features in the scene (or of a specific manipulation object) that are highly correlated to features recorded from a previously taught task. When a task is demonstrated by the user, features are saved throughout the task in the form of a keyframe. The keyframe may be an RGB image containing a multi-dimensional embedding with depth (if valid) per pixel.

The embeddings act as a feature descriptor that may establish per pixel correspondences at run-time, assuming that the current image is similar enough to the reference that existed at teach time. Since depth exists at (mostly) each pixel, correspondences can be used to solve for a delta pose between the current and reference images. Inliers may be detected using Euclidian constraints and apply a Levenberg-Marquardt least-squares function with RANSAC to solve for a 6-DOF pose.

The delta pose serves as a correction that can be applied to adapt the taught behavior sequence to the current scene. Because embeddings may be defined at each pixel, keyframes may be as broad as including every pixel in the image, or as narrow as only using pixels in a user-defined mask. As discussed, a user may define a mask by selectively annotating regions of the image to be relevant for the task or on an object.

In addition to visual sensing, in one configuration, the robot collects and processes an audio input. The audio provides another set of embeddings as input for teaching the robot. As an example, the robot acquires audio input by asking questions and understanding spoken language responses from a person. Spoken responses may be understood using a custom keyword-detection module.

The robot may understand a custom wakeword, a set of objects (e.g., "mug" or "bottle") and a set of locations (e.g., "cabinet" or "fridge") using a fully-convolutional keyword-spotting model. In one configuration, the model listens for the wakeword at an interval, such as every 32 ms. When the wakeword is detected, the robot looks to detect an object or location keyword. During training, noise is artificially added to make recognition more robust.

As discussed, to teach the robot a task, the operator uses a set of VR modes. Each behavior may have a corresponding VR mode for setting and commanding the specific parameters of that behavior. Each behavior mode may include customized visualizations to aid in setting each parameter, dependent on the type of parameter. For example, when setting the parameters for a pull door motion, the hinge axis is labeled and visualized as a line and candidate pull poses for the gripper are restricted to fall on the arc about the hinge. To aid in the teaching process, several utility VR modes are used, such as reverting behaviors, annotating the environment with relevant objects, and repositioning of the virtual robot, camera image, and menus in the VR world.

During execution, a pose of the robot and parts of the environment may be different from what was used during training. Feature matching may be used to find features in the environment that are similar to those that were taught. A pose delta may be established from matched feature correspondences. User taught behaviors are transformed by the computed pose delta. In one configuration, multiple keyframes are passed to the matching problem. The best matching keyframe is selected based on the number of correspondences.

Figure 5:
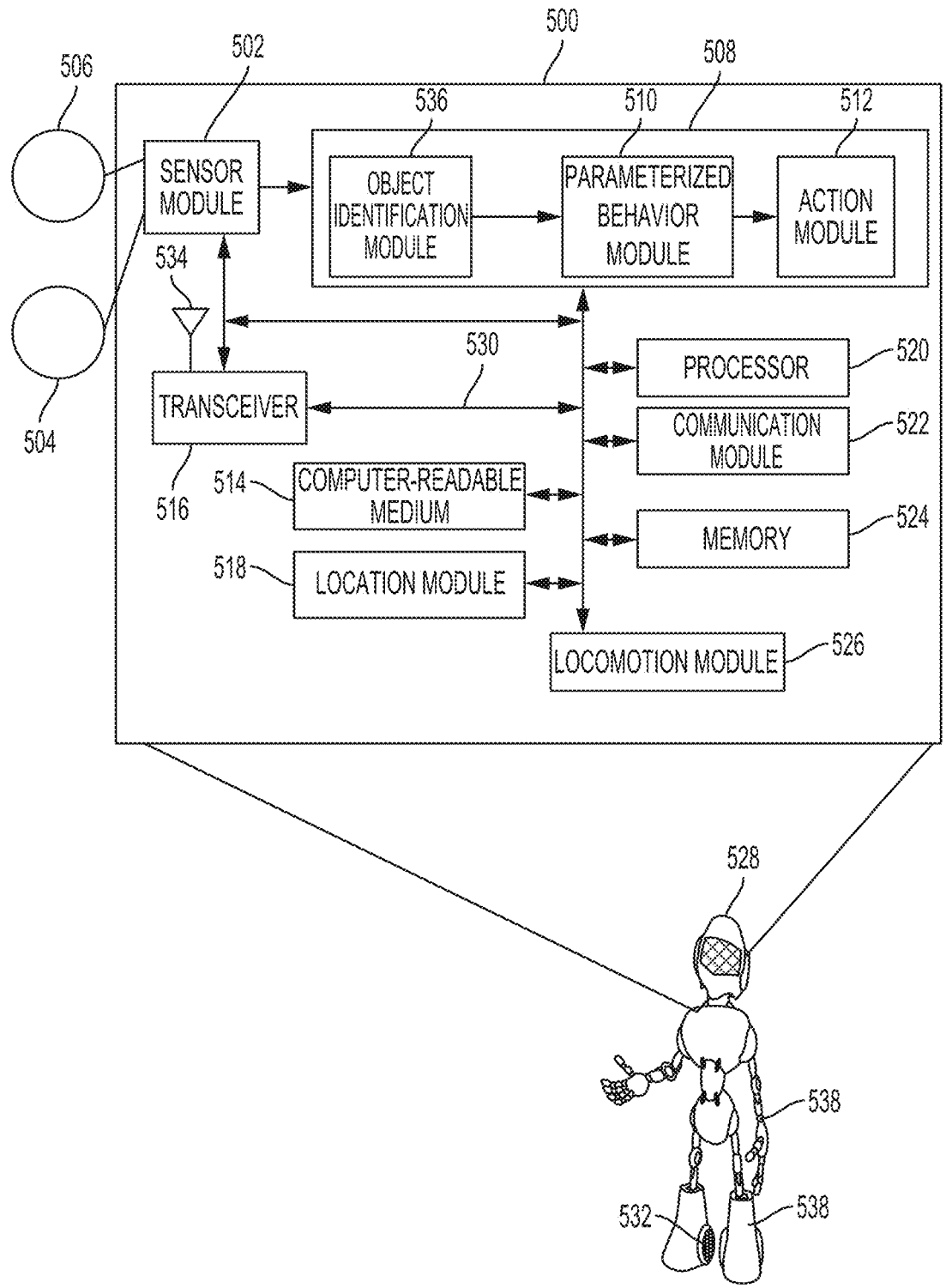
FIG. 5 is a diagram illustrating an example of a hardware implementation for a robotic control system according to aspects of the present disclosure.

FIG. 5 is a diagram illustrating an example of a hardware implementation for a robotic control system 500 according to aspects of the present disclosure. The robotic control system 500 may be a component of an autonomous or semi-autonomous system, such as a vehicle, a robotic device 528, or other device. In the example of FIG. 5, the robotic control system 500 is a component of the robotic device 528. The robotic control system 500 may be used to control an action of the robotic device 528 by based on updating parameters of the set of parameterized behaviors in accordance with a relative transform to carry out a task in a task environment.

The robotic control system 500 may be implemented with a bus architecture, represented generally by a bus 530. The bus 530 may include any number of interconnecting buses and bridges depending on the specific application of the robotic control system 500 and the overall design constraints. The bus 530 links together various circuits including one or more processors and/or hardware modules, represented by a processor 520, a communication module 522, a location module 518, a sensor module 502, a locomotion module 526, a memory 524, a task module 508, and a computer-readable medium 514. The bus 530 may also link various other circuits such as timing sources, peripherals, voltage regulators, and power management circuits, which are well known in the art, and therefore, will not be described any further.

The robotic control system 500 includes a transceiver 516 coupled to the processor 520, the sensor module 502, the task module 508, the communication module 522, the location module 518, the locomotion module 526, the memory 524, and the computer-readable medium 514. The transceiver 516 is coupled to an antennae 534. The transceiver 516 communicates with various other devices over a transmission medium. For example, the transceiver 516 may receive commands (e.g., to initiate a task) via transmissions from an operator of the robotic device 528. As discussed herein, the operator may be in a location that is remote from the location of the robotic device 528. In some aspects, the task may also be initiated in the robotic device 528 via, for example, the task module 508.

The robotic control system 500 includes the processor 520 coupled to the computer-readable medium 514. The processor 520 performs processing, including the execution of software stored on the computer-readable medium 514 providing functionality according to the disclosure. The software, when executed by the processor 520, causes the robotic control system 500 to perform the various functions described for a particular device, such as the robotic device 528, or any of the modules 502, 508, 514, 516, 518, 520, 522, 524, 526. The computer-readable medium 514 may also be used for storing data that is manipulated by the processor 520 when executing the software.

The sensor module 502 may be used to obtain measurements via different sensors, such as a first sensor 506 and a second sensor 504. The first sensor 506 may be a vision sensor, such as a stereoscopic camera or an RGB camera, for capturing 2D images. The second sensor 504 may be a ranging sensor, such as a LiDAR sensor or a RADAR sensor. Of course, aspects of the present disclosure are not limited to the aforementioned sensors as other types of sensors, such as, for example, thermal, sonar, and/or lasers are also contemplated for either of the sensors 504, 506. The measurements of the first sensor 506 and the second sensor 504 may be processed by one or more of the processor 520, the sensor module 502, the communication module 522, the location module 518, the locomotion module 526, the memory 524, in conjunction with the computer-readable medium 514 to implement the functionality described herein. In one configuration, the data captured by the first sensor 506 and the second sensor 504 may be transmitted as a video feed to the operator via the transceiver 516. The first sensor 506 and the second sensor 504 may be coupled to the robotic device 528 or may be in communication with the robotic device 528.

The location module 518 may be used to determine a location of the robotic device 528. For example, the location module 518 may use a global positioning system (GPS) to determine the location of the robotic device 528. The communication module 522 may be used to facilitate communications via the transceiver 516. For example, the communication module 522 may be configured to provide communication capabilities via different wireless protocols, such as WiFi, long term evolution (LTE), 3G, etc. The communication module 522 may also be used to communicate with other components of the robotic device 528 that are not modules of the robotic control system 500.

The locomotion module 526 may be used to facilitate locomotion of the robotic device 528 and/or components (e.g., limbs, hands, etc.) of the robotic device 528. As an example, the locomotion module 526 may control movement of the limbs 538 and/or wheels 532. As another example, the locomotion module 526 may be in communication with a power source of the robotic device 528, such as an engine or batteries. Of course, aspects of the present disclosure are not limited to providing locomotion via propellers and are contemplated for other types of components for providing locomotion, such as treads, fins, and/or jet engines.

The robotic control system 500 also includes the memory 524 for storing data related to operation of the robotic device 528 and the task module 508. The modules may be software modules running in the processor 520, resident/stored in the computer-readable medium 514 and/or memory 524, one or more hardware modules coupled to the processor 520, or some combination thereof.

A task module 508 may be in communication with the sensor module 502, the transceiver 516, the processor 520, the communication module 522, the location module 518, the locomotion module 526, the memory 524, and the computer-readable medium 514. In one configuration, the task module 508 includes a parameterized behavior module 510, an action module 512, and an object identification module 536. The object identification module 536 may identify objects near the robotic device 528. That is, based on an input received from the sensors 504, 506 via the sensor module 502, the object identification module 536 identifies objects (e.g., targets). The object identification module 536 may be a trained object classifier (e.g., artificial neural network).

The identified objects may be output to parameterized behavior module 510 to map pixels and/or dense neural network descriptors from the present scene to those from the keyframe, such that adjustments or updates may be continually made to the parameterized behaviors. For example, the adjustments may be based on the relative transform between the task image and the teaching image (e.g., keyframe) based on the mapping. The updating of the parameters of the set of parameterized behaviors is based on the relative transform. The action module 512 facilitates performing action/task to the robotic device that include the updated parameterized behaviors. The parameterized behaviors may be stored in the memory 524. For example, the updated parameterized behaviors is output to at least the locomotion module 526 to control the robotic device 528 to perform the updated parameterized behaviors.

Figure 6:
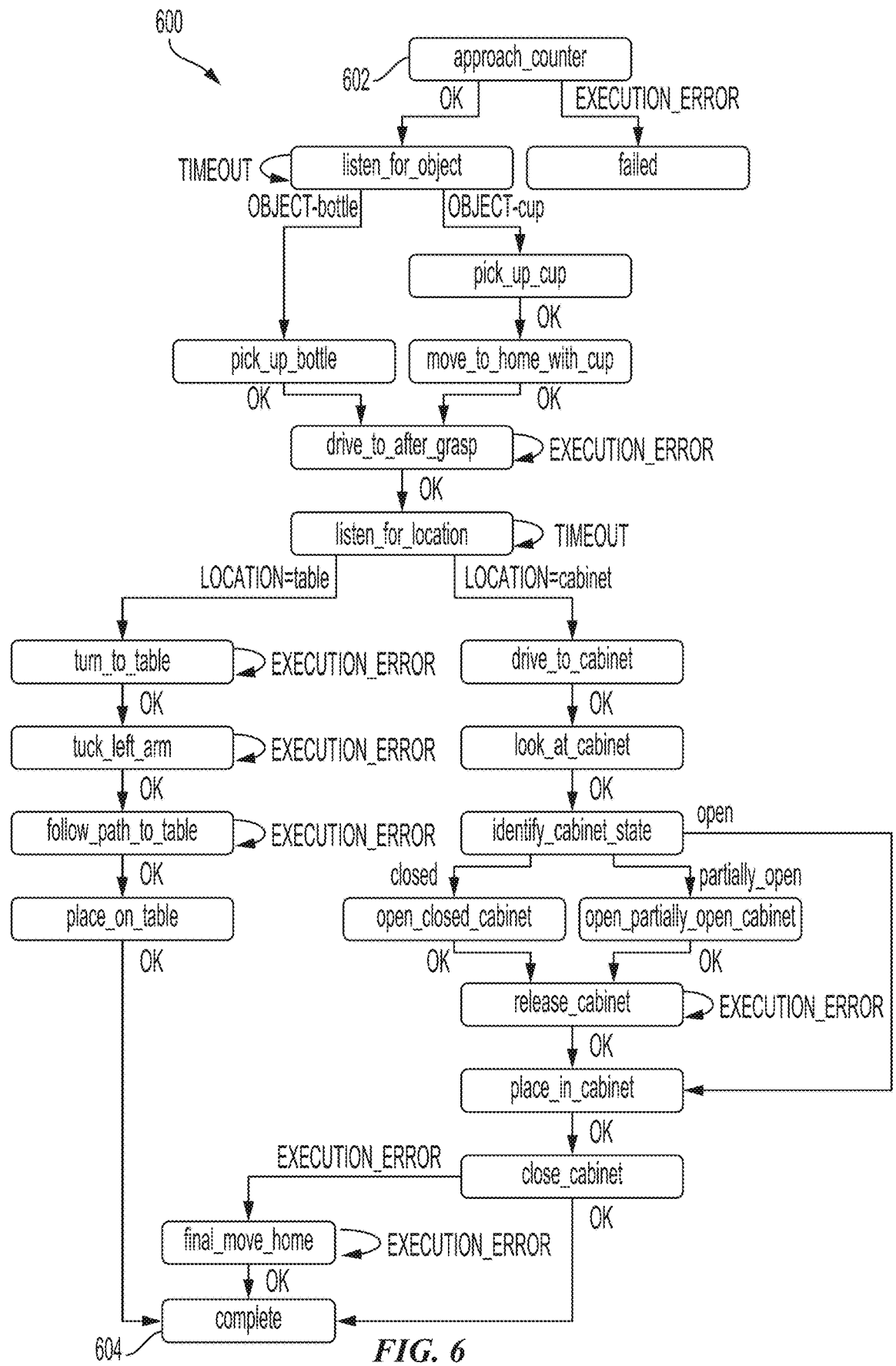
FIG. 6 illustrates an example of a graph sequence for taught behaviors according to aspects of the present disclosure.

FIG. 6 illustrates an example of a graph sequence 600 for taught behaviors according to aspects of the present disclosure. As shown in FIG. 6, the graph sequence 600 includes a start node 602 and an end node 604. The graph sequence 600 may branch or loop based on a sensed visual input, audio input, or other conditions.

For example, as shown in FIG. 6, after the start node 602, the robot may execute a "listen_for_object" behavior. In this example, the robot determines whether it has sensed a visual or audio input corresponding to a cup or bottle. In this example, different behavior sequences are executed based on whether the sensed input corresponds to the cup or the bottle. Aspects of the present disclosure are not limited to the behaviors shown in FIG. 6.

Figure 7:
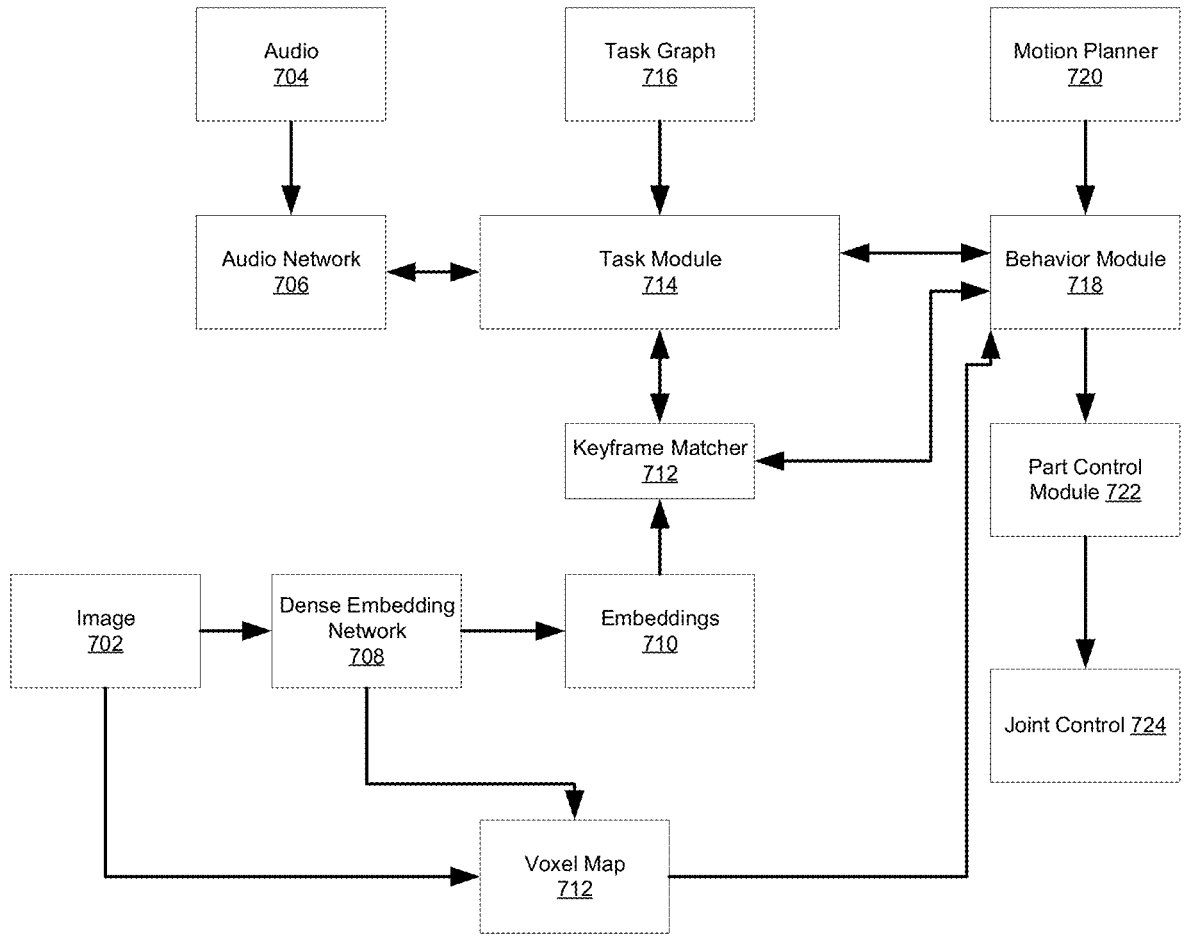
FIG. 7 illustrates an example of software modules for a robotic system according to aspects of the present disclosure.

FIG. 7 illustrates an example of software modules for a robotic system according to aspects of the present disclosure. The software modules of FIG. 7 may be use one or more components of the hardware system of FIG. 5, such as the processor 520, communication module 522, location module 518, sensor module 502, locomotion module 526, memory 524, task module 508, and computer-readable medium 514. Aspects of the present disclosure are not limited to the modules of FIG. 7.

As shown in FIG. 7, the robot may receive audio data 704 and/or image data/input 702. The image input 702 may be an RGB-D image. The audio network 706 may listen for a wakeword at an interval. The audio network 706 receives raw audio data 704 to detect the wakeword and to extract keywords from the raw audio data 704.

A neural network, such as the dense embeddings network 708, receives the image data 702. The image data 702 may be received at an interval. The dense embeddings network 708 processes the image input 702 and outputs the embeddings 710 of the image input 702. The embeddings 710 and image data 702 may be combined to generate a voxel map 712. The embeddings 710 may also be input to a keyframe matcher 712.

The keyframe matcher 712 compares the embeddings 710 to multiple keyframes. A matching keyframe is identified when the embeddings 710 correspond to embeddings of a keyframe. The embeddings 710 may include pixel descriptors, depth information, and other information.

A task module 714 may receive one or more task graphs 716. The task module 714 provides responses to requests from the keyframe matcher 712. The keyframe matcher 712 matches the task to the matched keyframe. The task may be determined from the task graph 716.

The task module 714 may also transmit a behavior request to a behavior module 718. The behavior module 718 provides a behavior status to the task module 714. Additionally, the behavior module 718 may request information regarding matching keyframes and corresponding tasks from the keyframe matcher 712. The keyframe matcher 712 provides information regarding matching keyframes and corresponding tasks to the behavior module 718. The behavior module 718 may also receive voxels from the voxel map 712.

In one configuration, the behavior module 718 receives a motion plan from the motion planner 720 in response to a motion plan request. The behavior module 718 also receives a part status from a part control module 722. The behavior module 718 transmits a part command to the part control module 722 in response to receiving the part status. Finally, the part control module 722 receives a joint status from a joint control module 724. The part control module 722 transmits a joint command to the joint control module 724 in response to receiving the joint status.

Figure 8:
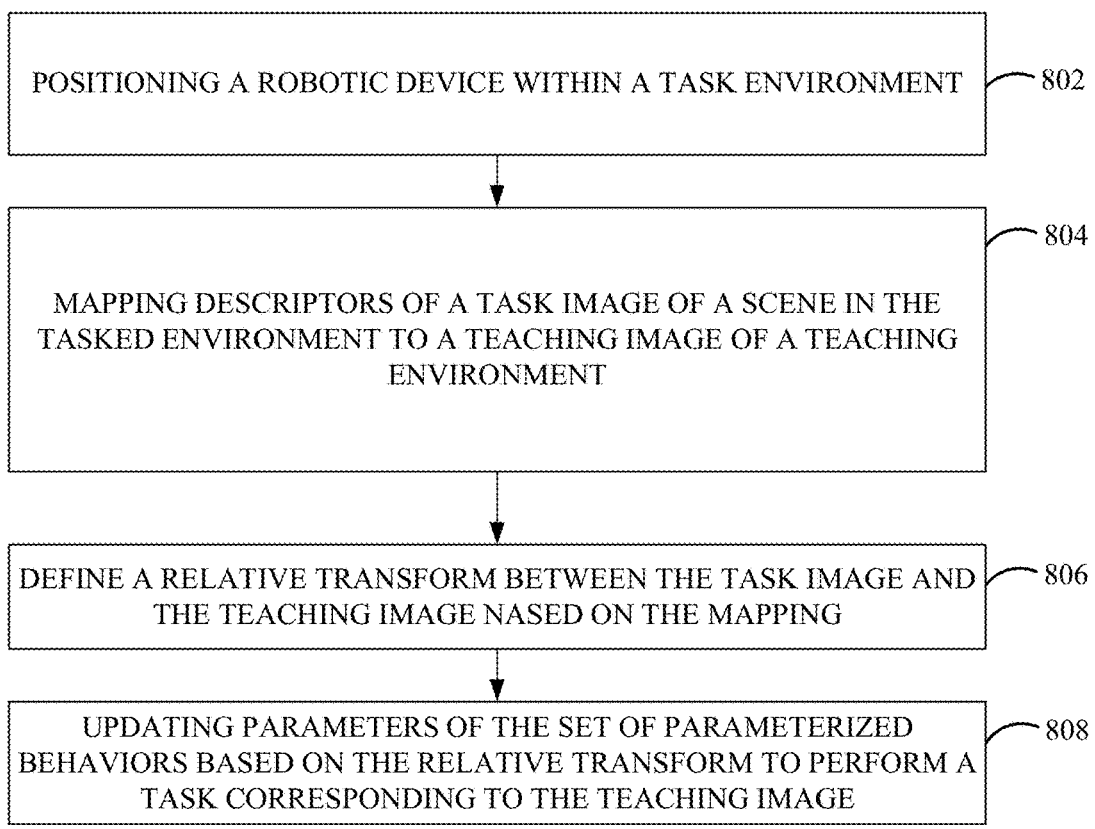
FIG. 8 illustrates a method for controlling a robotic device according to aspects of the present disclosure.

FIG. 8 illustrates a method 800 for controlling a robotic device according to an aspect of the present disclosure. At block 802, the robotic device is positioned within a task environment when performing a task. The robotic device is positioned to deviate from starting conditions or positions that the robotic device was taught to perform a task in a teaching environment using a virtual reality (VR) interface. The task environment is similar to or same as the teaching environment.

At block 804, pixels and/or neural network descriptors of a task image of a scene in the tasked environment are mapped to a teaching image in the teaching environment when the robotic device is tasked with carrying out a set of parameterized behaviors that were taught during a virtual reality controlled sequence associated with the task. At block 806, a relative transform between the task image and the teaching image is defined based on the mapping. At block 808, parameters of the set of parameterized behaviors are updated based on the relative transform to carry out the task in the task environment.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for performing a task by a robotic device, comprising:
    mapping a plurality of task image pixel descriptors associated with a first group of pixels in a task image of a task environment to a plurality of teaching image pixel descriptors associated with a second group of pixels in a teaching image of a teaching environment based on positioning the robotic device within the task environment;
    determining a relative transform between the task image and the teaching image based on mapping the plurality of task image pixel descriptors, the relative transform indicating a change in one or more of points of three-dimensional (3D) space between the task image and the teaching image;
    updating one or more parameters of a set of parameterized behaviors associated with the teaching image based on determining the relative transform; and
    performing the task associated with the set of parameterized behaviors based on updating the one or more parameters.

2. The method of claim 1, wherein the set of parameterized behaviors includes one or more behaviors performed by a user while training the robotic device to perform the task.

3. The method of claim 1, wherein the plurality of task image pixel descriptors are mapped to the plurality of teaching image pixel descriptors at an interval.

4. The method of claim 1, wherein a first position of the robotic device in the task environment is different from a second position of the robotic device during training in the teaching environment.

5. The method of claim 4, wherein the first position and the second position are associated with one or both of a starting location or pose of the robotic device.

6. The method of claim 5, wherein the starting location and the pose of the robotic device are relative to an object in the task environment.

7. The method of claim 1, wherein:
    each task image pixel descriptor of the plurality of task image pixel descriptors includes a first pixel value associated with a single pixel in the first group of pixels;
    each teaching image pixel descriptor of the plurality of teaching image pixel descriptors includes a second pixel value associated with a single pixel in the second group of pixels; and
    the first pixel value has a same value as the second pixel value.

8. An apparatus for controlling a robotic device, comprising:
    at least one processor; and
    at least one memory coupled with the at least one processor and storing instructions operable, when executed by the at least one processor, to cause the apparatus to:
        map a plurality of task image pixel descriptors associated with a first group of pixels in a task image of a task environment to a plurality of teaching image pixel descriptors associated with a second group of pixels in a teaching image of a teaching environment based on positioning the robotic device within the task environment;

determine a relative transform between the task image and the teaching image based on mapping the plurality of task image pixel descriptors, the relative transform indicating a change in one or more of points of three-dimensional (3D) space between the task image and the teaching image;

update one or more parameters of a set of parameterized behaviors associated with the teaching image based on determining the relative transform; and control the robotic device to perform a task associated with the set of parameterized behaviors based on updating the one or more parameters.

9. The apparatus of claim 8, wherein the set of parameterized behaviors includes one or more behaviors performed by a user while training the robotic device to perform the task.

10. The apparatus of claim 8, wherein the plurality of task image pixel descriptors are mapped to the plurality of teaching image pixel descriptors at an interval.

11. The apparatus of claim 8, wherein a first position of the robotic device in the task environment is different from a second position of the robotic device during training in the teaching environment.

12. The apparatus of claim 11, wherein the first position and the second position are associated with one or both of a starting location or pose of the robotic device.

13. The apparatus of claim 12, wherein the starting location and the pose of the robotic device are relative to an object in the task environment.

14. The apparatus of claim 8, wherein:
each task image pixel descriptor of the plurality of task image pixel descriptors includes a first pixel value associated with a single pixel in the first group of pixels;
each teaching image pixel descriptor of the plurality of teaching image pixel descriptors includes a second pixel value associated with a single pixel in the second group of pixels; and
the first pixel value has a same value as the second pixel value.

15. A non-transitory computer-readable medium having program code recorded thereon for controlling a robotic device, the program code executed by at least one processor and comprising:
program code to map a plurality of task image pixel descriptors associated with a first group of pixels in a task image of a task environment to a plurality of teaching image pixel descriptors associated with a second group of pixels in a teaching image of a teaching environment based on positioning the robotic device within the task environment;

program code to determine a relative transform between the task image and the teaching image based on mapping the plurality of task image pixel descriptors, the relative transform indicating a change in one or more of points of three-dimensional (3D) space between the task image and the teaching image;

program code to update one or more parameters of a set of parameterized behaviors associated with the teaching image based on determining the relative transform; and program code to control the robotic device to perform a task associated with the set of parameterized behaviors based on updating the one or more parameters.

16. The non-transitory computer-readable medium of claim 15, wherein the set of parameterized behaviors includes one or more behaviors performed by a user while training the robotic device to perform the task.

17. The non-transitory computer-readable medium of claim 15, wherein the plurality of task image pixel descriptors are mapped to the plurality of teaching image pixel descriptors at an interval.

18. The non-transitory computer-readable medium of claim 15, wherein a first position of the robotic device in the task environment is different from a second position of the robotic device during training in the teaching environment.

19. The non-transitory computer-readable medium of claim 18, wherein the first position and the second position are associated with one or both of a starting location or pose of the robotic device.

20. The non-transitory computer-readable medium of claim 19, wherein the starting location and the pose of the robotic device are relative to an object in the task environment.

* * * * *